United States Patent
Sethi et al.

(10) Patent No.: US 12,425,866 B2
(45) Date of Patent: Sep. 23, 2025

(54) BLUETOOTH DEVICE AND BLUETOOTH GATEWAY

(71) Applicant: Telefonaktiebolaget LM Ericsson (publ), Stockholm (SE)

(72) Inventors: Mohit Sethi, Helsinki (FI); Patrik Salmela, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 477 days.

(21) Appl. No.: 17/760,176

(22) PCT Filed: Feb. 5, 2020

(86) PCT No.: PCT/EP2020/052870
§ 371 (c)(1),
(2) Date: Aug. 4, 2022

(87) PCT Pub. No.: WO2021/155922
PCT Pub. Date: Aug. 12, 2021

(65) Prior Publication Data
US 2023/0049341 A1    Feb. 16, 2023

(51) Int. Cl.
*H04W 12/50* (2021.01)
*H04L 9/08* (2006.01)
(Continued)

(52) U.S. Cl.
CPC ............ *H04W 12/50* (2021.01); *H04L 9/085* (2013.01); *H04W 12/041* (2021.01); *H04W 12/069* (2021.01)

(58) Field of Classification Search
CPC . H04W 12/50; H04W 12/069; H04W 12/041; H04L 9/085
See application file for complete search history.

(56) References Cited

U.S. PATENT DOCUMENTS

| 8,213,620 B1* | 7/2012 | Sussland | H04L 9/0894 380/278 |
| 2004/0005061 A1* | 1/2004 | Buer | H04L 63/0485 380/282 |

(Continued)

OTHER PUBLICATIONS

International Search Report and Written Opinion dated Oct. 6, 2020 in International Application No. PCT/EP2020/052870 (12 pages).

(Continued)

*Primary Examiner* — Hee K Song
(74) *Attorney, Agent, or Firm* — Rothwell, Figg, Ernst & Manbeck, P.C.

(57) ABSTRACT

A Bluetooth device (702) is disclosed, the Bluetooth device being provisioned with a security credential (710) that is shared with an authentication server (706). The Bluetooth device comprises processing circuitry configured to use a Bluetooth pairing mechanism to establish a pairing with a Bluetooth gateway (704*a-c*) by establishing a shared secret key with the Bluetooth gateway and to perform an Extensible Authentication Protocol (EAP) authentication method towards the authentication server using the security credential, wherein performing the EAP authentication method comprises using the paired Bluetooth gateway to forward messages to and from the authentication server. The processing circuitry is further configured to bind the pairing established with the paired Bluetooth gateway to the performed EAP authentication method. Also disclosed are a Bluetooth gateway and methods performed by a Bluetooth device and a Bluetooth gateway.

13 Claims, 10 Drawing Sheets

(51) Int. Cl.
*H04W 12/041* (2021.01)
*H04W 12/069* (2021.01)

(56) References Cited

U.S. PATENT DOCUMENTS

| | | | | |
|---|---|---|---|---|
| 2008/0263269 | A1* | 10/2008 | Kadosh | G11C 15/00 |
| | | | | 711/108 |
| 2013/0275656 | A1* | 10/2013 | Talagala | G06F 12/0246 |
| | | | | 711/103 |
| 2016/0117263 | A1* | 4/2016 | Kanno | H04L 63/061 |
| | | | | 713/171 |
| 2017/0317981 | A1* | 11/2017 | Klein | H04L 63/0281 |
| 2018/0255457 | A1* | 9/2018 | Vedantham | H04L 63/0428 |
| 2019/0245686 | A1* | 8/2019 | Rahimi | G06F 21/72 |
| 2019/0268148 | A1* | 8/2019 | Sun | H04L 9/302 |

OTHER PUBLICATIONS

Kim, H. et al., "EAP Bluetooth Application draft-kim-eap-bluetooth-00", EAP Working Group, Internet-Draft, Feb. 9, 2004 (23 pages).
Gehrmann, C. et al., "Enhancements to Bluetooth Baseband Security", Ericsson Mobile Communcations AB, Ericsson Research, 2007 (15 pages).
Aboba, B. et al., "Extensible Authentication Protocol (EAP)", Network Working Group, Request for Comments: 3748, Obsoletes: 2284, Category: Standards Track, Jun. 2004 (67 pages).

* cited by examiner

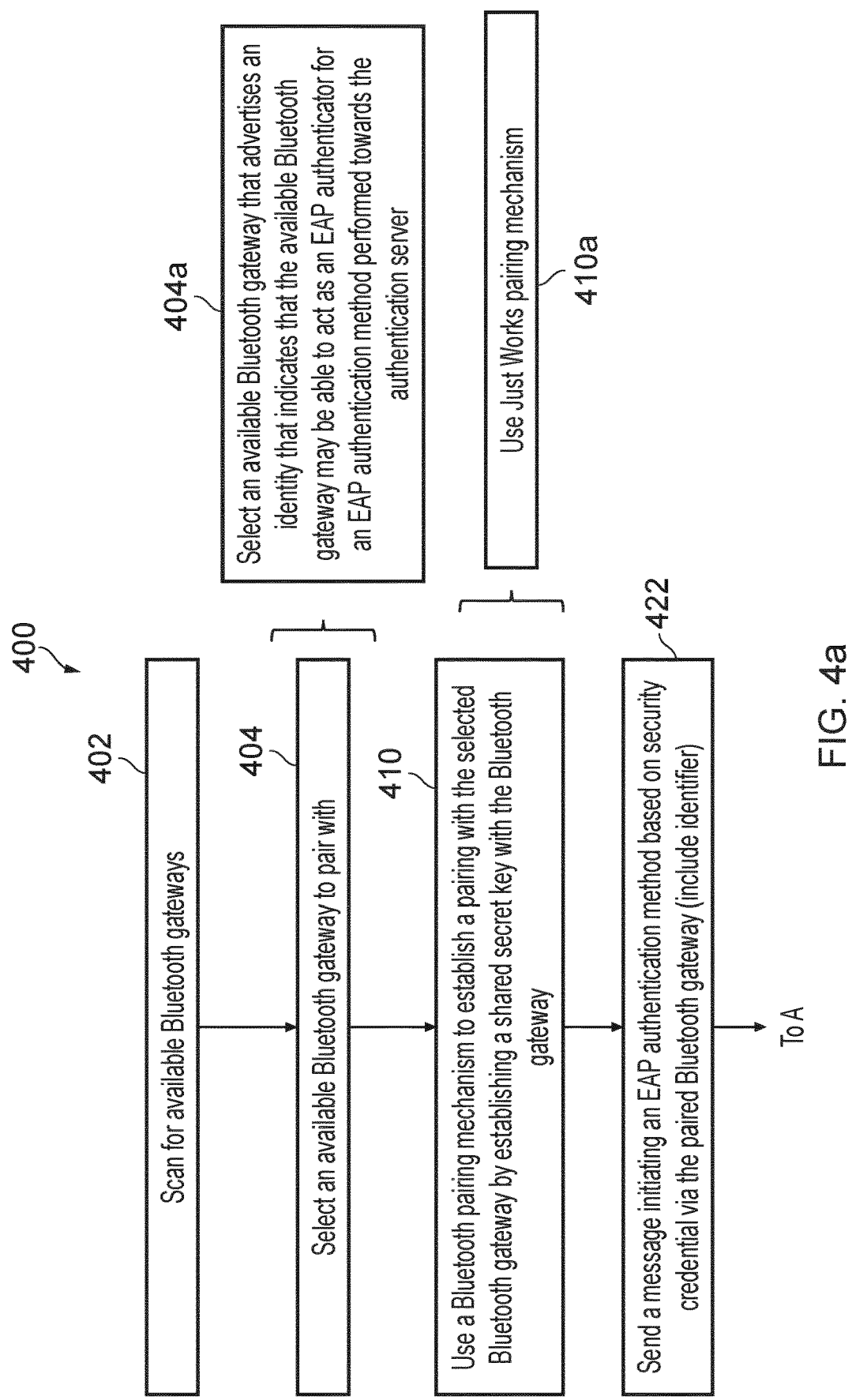

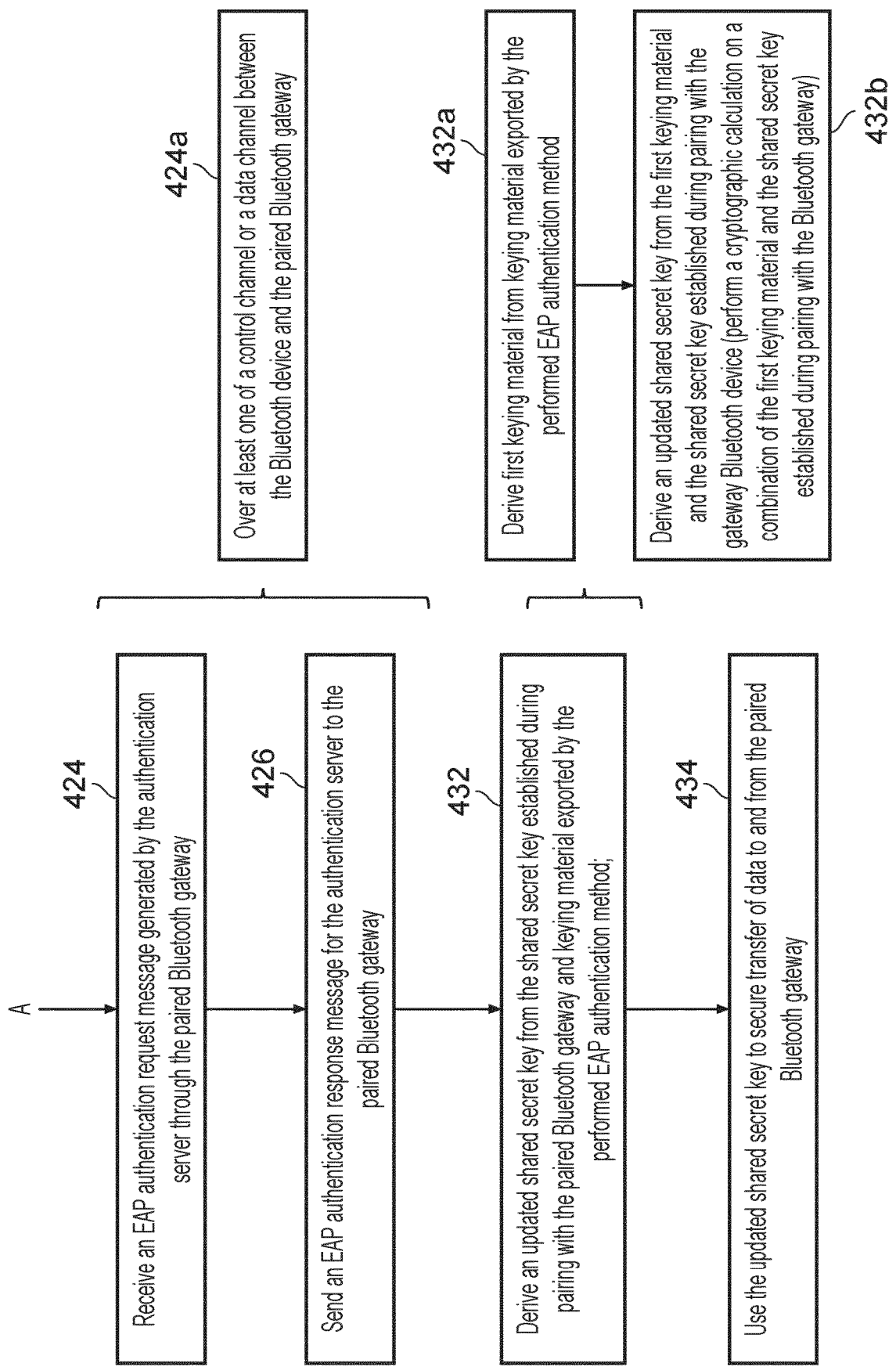

BLUETOOTH DEVICE AND BLUETOOTH GATEWAY

CROSS REFERENCE TO RELATED APPLICATIONS

This application is a 35 U.S.C. § 371 National Stage of International Patent Application No. PCT/EP2020/052870, filed Feb. 5, 2020.

TECHNICAL FIELD

The present disclosure relates to a Bluetooth device, wherein the Bluetooth device is provisioned with a security credential that is shared with an authentication server, and also to a Bluetooth gateway. The present disclosure also relates to methods carried out by a Bluetooth device and Bluetooth gateway, and to a computer program and a computer program product.

BACKGROUND

Bluetooth is a popular low-power radio technology managed by the Bluetooth Special Interest Group. A Bluetooth device is a device that is compatible with at least one version of the Bluetooth standards maintained by this group. There are two main types of Bluetooth currently widely used in the market, these are Bluetooth classic (for applications such as headphones and speakers), and Bluetooth Low Energy (LE) (for applications such blood pressure monitors). Bluetooth was specifically designed for supporting ad-hoc interaction between devices without the involvement of third parties such as servers or Certificate Authorities (CA).

Bluetooth security is based on the Secure Simple Pairing (SSP) protocol. This requires that the two devices wishing to communicate securely first perform a Diffie-Hellman (DH) key exchange, which is typically followed by an authentication step. There are four possible modes of the SSP protocol to establish a Bluetooth pairing:

1. Just Works: This is an unauthenticated DH that protects against passive eavesdropping but not active Man-in-the-middle attacks.
2. Numeric Comparison: A user sees 6-digit PINs on both devices seeking to pair. If they match, the user confirms that the pairing should go ahead on both the devices by pressing okay.
3. Passkey Entry: One device shows a PIN code which a user needs to input into the other device.
4. Out-of-Band (OOB): Requires an OOB channel such as one device scanning a QR code shown on the other device or tapping the near field communication (NFC) interface.

The Bluetooth protocol stack is shown in FIG. 1. Some important protocols are:
PHY and Link Layer (LL) 102: Provide the physical and radio layer
L2CAP 104: This layer is responsible for multiplexing data between different higher layer protocols, as well as segmentation and reassembly of packets.
SMP 106: Security Manager Protocol is used for carrying out Bluetooth pairing and establishing keys.

For two devices to communicate securely, they first perform connection setup using the GAP (Generic Access Protocol) scan request and scan response. This is followed by the pairing procedure as shown in FIG. 2. With reference to FIG. 2, initiating device A sends scan request 202 to non-initiating device B, and receives scan response 204. Device A then sends connection request 206, and public key exchange 208 is performed between device A and device B. Authentication stage 1 210 is performed between device A and device B according to one of the SSP pairing modes. For pairing modes Numeric Comparison, Passkey Entry and OOB, Authentication stage 2 212 is then performed. For Just Works pairing mode, Authentication stage 2 212 is not performed. Device A and device B then compute a link key 214 and the connection between them is then managed by the Link Management Protocol (LMP) protocol 216.

Bluetooth devices are employed in a wide range of different use cases. One example is in connected sensors for environment monitoring. Owing to its low power requirements, Bluetooth is increasingly used for tracking shipments and ensuring that fragile items are not exposed to unwanted environments during transit. A sensor attached to an item for shipping can monitor the external environment and report its readings via connection to a suitable Bluetooth device that offers gateway functionality to other networks. A typical shipment may involve an item of cargo being transferred from a first warehouse to a first lorry, a first airport cargo terminal, an airplane, a second airport cargo terminal, a second lorry and a second warehouse. At each stage of the shipment, it may be envisaged that the Bluetooth sensor attached to the cargo will be required to connect to a different Bluetooth gateway in order to access other data networks or the wider Internet.

All SSP pairing modes except for Just Works require some form of user interaction in order to establish a secure communication link with a new device, or when keys expire for existing connections to devices. For an individual user with a single smartphone and a few Bluetooth peripherals, this requirement is not overly onerous. However, for enterprise use cases, the need for user interaction at every pairing can become problematic, especially when the Bluetooth device requires access to a gateway for delivery of data to the Cloud, and may be mobile over a large geographical area. For example, in the shipment scenario discussed above, the Bluetooth sensor may need Internet connectivity through a different gateway, and consequently user interaction, at each stage of the shipment.

The Extensible Authentication Protocol (EAP) is an authentication framework that provides support for multiple authentication methods and credential types. Such methods include EAP-TLS, which uses certificates, EAP-SIM/EAP-AKA', which use SIM card based credentials, and EAP-Pre Shared Key, or EAP-PSK, which uses shared secrets. The use of EAP for authentication in Bluetooth has been proposed by Christian Gehrman and Kaisa Nyberg in their article "Enhancements to Bluetooth Baseband Security", Nordic Workshop on Secure IT Systems, NordSec 2001, pages 39-53, Proceedings 2001. Gehrman and Nyberg proposed running an EAP authentication method between two Bluetooth devices (master/slave) as a replacement for one of the four pairing methods discussed above. Their proposal thus requires Bluetooth devices to be pre-configured with appropriate security credentials to run the EAP authentication method with any other Bluetooth device with which it may wish to pair, as EAP replaces the pairing process. For scenarios where PSK based EAP is used, and it is envisaged that a single Bluetooth device will connect to multiple different peers, different keys for each peer should be configured into the device, as well as information indicating which key to use with which peer. The difficulty in ensuring correct configuration of security credentials for multiple different peers means that the solution proposed by Gehrman and Nyberg is of limited assistance for addressing the challenge of connectivity for mobile Bluetooth devices.

SUMMARY

It is an aim of the present disclosure to provide a Bluetooth device, a Bluetooth gateway, methods and a computer readable medium which at least partially address one or more of the challenges discussed above.

According to a first aspect of the present disclosure, there is provided a Bluetooth device, wherein the Bluetooth device is provisioned with a security credential that is shared with an authentication server. The Bluetooth device comprises processing circuitry configured to use a Bluetooth pairing mechanism to establish a pairing with a Bluetooth gateway by establishing a shared secret key with the Bluetooth gateway, and to perform an Extensible Authentication Protocol (EAP) authentication method towards the authentication server using the security credential, wherein performing the EAP authentication method comprises using the paired Bluetooth gateway to forward messages to and from the authentication server. The processing circuitry is further configured to bind the pairing established with the paired Bluetooth gateway to the performed EAP authentication method.

According to another aspect of the present disclosure, there is provided a Bluetooth gateway. The Bluetooth gateway comprises processing circuitry configured to use a Bluetooth pairing mechanism to establish a pairing with a Bluetooth device by establishing a shared secret key with the Bluetooth device, and to forward messages between the paired Bluetooth device and an authentication server to which the Bluetooth gateway has a trusted communication channel, wherein the messages are part of an EAP authentication method performed by the Bluetooth device and the authentication server. The processing circuitry is further configured to bind the pairing established with the Bluetooth device to the EAP authentication method performed by the Bluetooth device and the authentication server.

According to another aspect of the present disclosure, there is provided a method performed by a Bluetooth device, wherein the Bluetooth device is provisioned with a security credential that is shared with an authentication server. The method comprises using a Bluetooth pairing mechanism to establish a pairing with a Bluetooth gateway by establishing a shared secret key with the Bluetooth gateway, and performing an EAP authentication method towards the authentication server using the security credential, wherein performing the EAP authentication method comprises using the paired Bluetooth gateway to forward messages to and from the authentication server. The method further comprises binding the pairing established with the paired Bluetooth gateway to the performed EAP authentication method.

According to another aspect of the present disclosure, there is provided a method performed by a Bluetooth gateway. The method comprises using a Bluetooth pairing mechanism to establish a pairing with a Bluetooth device by establishing a shared secret key with the Bluetooth device, and forwarding messages between the paired Bluetooth device and an authentication server to which the Bluetooth gateway has a trusted communication channel, wherein the messages are part of an EAP authentication method performed by the Bluetooth device and the authentication server. The method further comprises binding the pairing established with the Bluetooth device to the EAP authentication method performed by the Bluetooth device and the authentication server.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one of the preceding aspects of the present disclosure.

BRIEF DESCRIPTION OF THE DRAWINGS

For a better understanding of the present disclosure, and to show more clearly how it may be carried into effect, reference will now be made, by way of example, to the following drawings in which:

FIGS. 4a and 4b show a flow chart illustrating process steps in another example of method performed by a Bluetooth device;

DETAILED DESCRIPTION

Aspects of the present disclosure provide a Bluetooth device and Bluetooth gateway that address the above discussed challenges of authenticating Bluetooth devices and providing them with Internet connectivity so that they can report their data to the cloud. Examples according to the present disclosure do not require any user involvement at the time of pairing in order to pair a Bluetooth device with a Bluetooth gateway, and also support devices that are mobile and operating in different environments. It is envisaged that the different environments may be under the same network owner, or that all network owners may trust the backend functions of the owner of the Bluetooth device. Examples of the present disclosure use an Extensible Authentication Protocol (EAP) method to perform authentication for a Bluetooth device using an authentication server. The authentication is then bound to a Bluetooth pairing established, for example, using the Just Works mode of Bluetooth pairing, which does not require user interaction. Examples of the present disclosure may therefore achieve an authenticated Bluetooth pairing without requiring user interaction. In some examples, connection configuration information for the Bluetooth device may be provided to the Bluetooth gateway by the authentication server during the EAP authentication. This information may then be used by the Bluetooth gateway for routing Bluetooth device traffic to an appropriate application server, which may for example be located in a data center or hosted in a cloud deployment.

Figure 1:
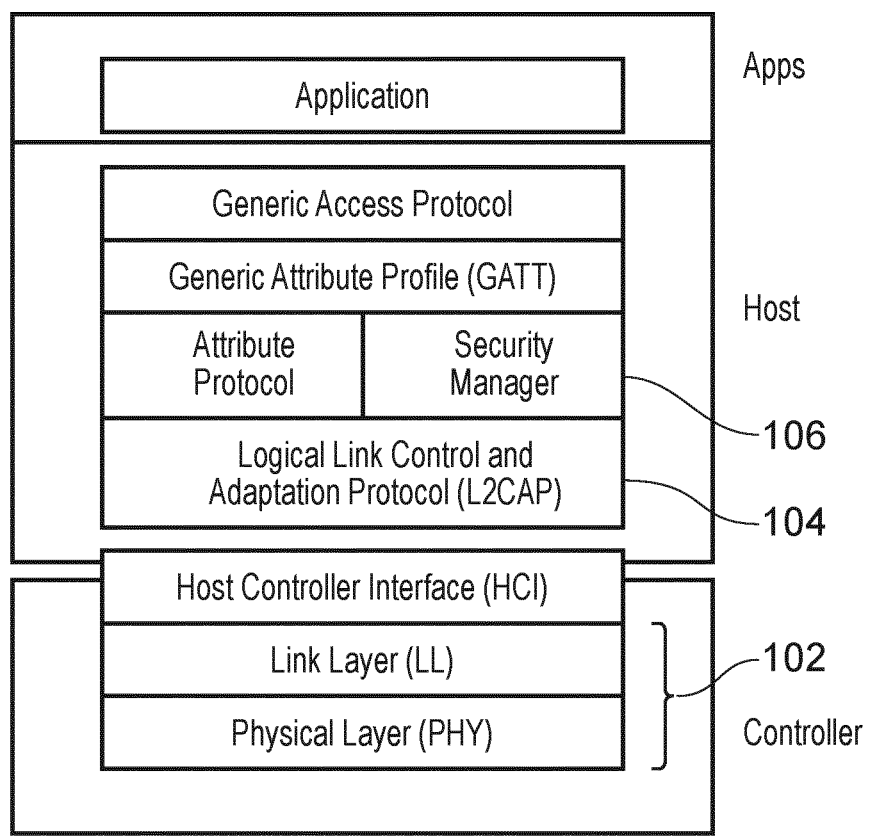
FIG. 1 illustrates the Bluetooth protocol stack.
Figure 2:
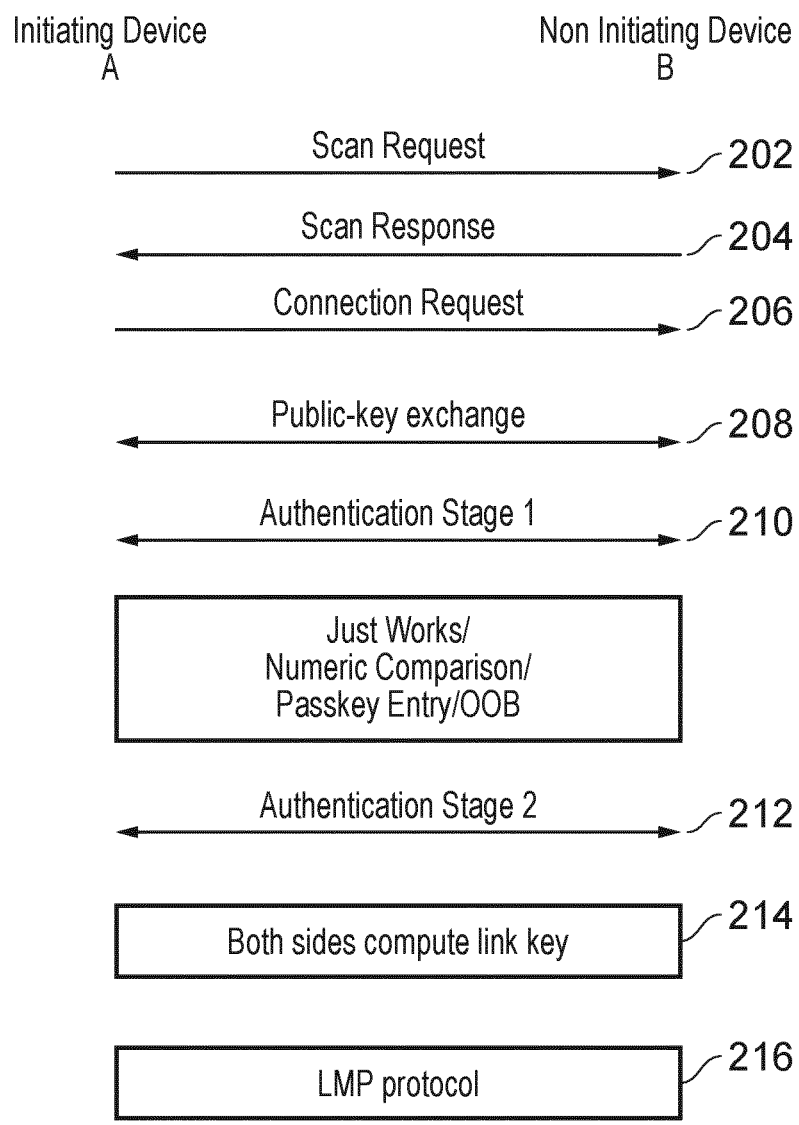
FIG. 2 illustrates Bluetooth pairing procedure.
Figure 3:
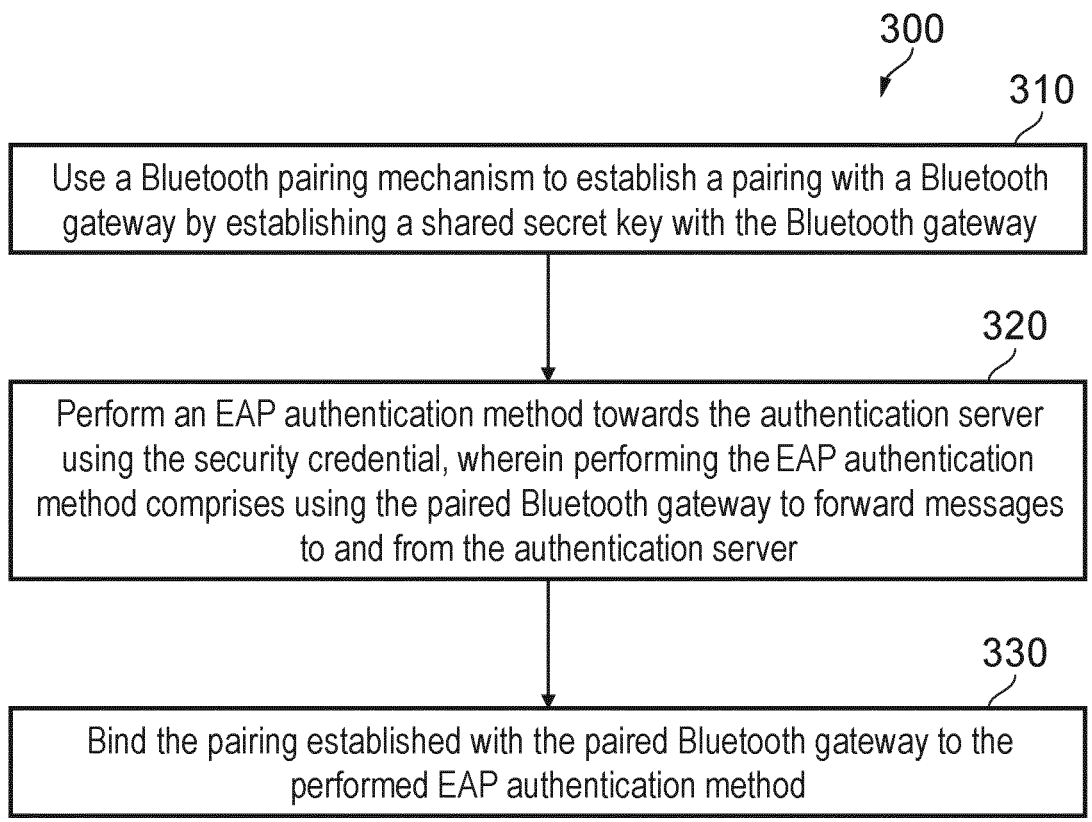
FIG. 3 is a flow chart illustrating process steps in a method performed by a Bluetooth device.

FIG. 3 is a flow chart illustrating process steps in a method 300 performed by a Bluetooth device according to examples of the present disclosure. The Bluetooth device may comprise any computing device that is operable to communicate using Bluetooth technology according to at least one of the Bluetooth standards maintained by the Bluetooth Special Interest Group. The Bluetooth device may also be referred to as a client device or, in the context of EAP authentication, as an EAP peer. The Bluetooth device is provisioned with a security credential that is shared with an authentication server. The authentication server may comprise a physical node or may comprise a virtual node offering authentication server functionality and running in a cloud, edge cloud or fog deployment. The authentication server may in some examples comprise authentication server functionality which is co-located with the Bluetooth gateway or another node. The security credential comprises a data object that may be used in verifying an identity of the Bluetooth device. The security credential may for example comprise a certificate, a password, a pre-shared key, a public/private key pair, etc.

Referring to FIG. 3, in a first step 310, the method 300 comprises using a Bluetooth pairing mechanism to establish a pairing with a Bluetooth gateway by establishing a shared secret key with the Bluetooth gateway. For the purposes of the present disclosure, a Bluetooth gateway comprises a Bluetooth device offering gateway functionality. The gateway functionality may provide connection to the Internet or to any other data network. As set out in the Bluetooth Core Specification version 5.2, a Bluetooth pairing is a process for creating one or more shared secret keys.

Referring still to FIG. 3, in step 320, the method 300 comprises performing an Extensible Authentication Protocol (EAP) authentication method towards the authentication server using the security credential, wherein performing the EAP authentication method comprises using the paired Bluetooth gateway to forward messages to and from the authentication server. The EAP authentication method may comprise any current or future method supported by the EAP authentication framework. In step 330, the method 300 comprises binding the pairing established with the paired Bluetooth gateway to the performed EAP authentication method.

Examples of the present disclosure thus propose performing Bluetooth pairing with a Bluetooth gateway and then performing an EAP authentication method towards an authentication server, with the Bluetooth gateway forwarding EAP authentication messages between the Bluetooth device and the authentication server. This forwarding behaviour may correspond to the behaviour defined for a "pass through authenticator", as set out in RFC 3748 "Extensible Authentication Protocol". It will be appreciated that examples of the present disclosure do not propose replacing the Bluetooth pairing mechanism with an EAP authentication method run between the Bluetooth device and the Bluetooth gateway, which would require the Bluetooth device to be provisioned with a security credential for each Bluetooth gateway to which it may wish to connect. Instead, examples of the present disclosure propose running an EAP authentication method between an authentication server and the Bluetooth device, following pairing with the Bluetooth gateway, with the gateway forwarding EAP authentication messages between the Bluetooth device and the authentication server. In this manner, the Bluetooth device may use the same security credential (corresponding to the authentication server) regardless of the particular Bluetooth gateway the Bluetooth device connects to. The step of binding the Bluetooth pairing to the performed EAP method provides additional security to the pairing between the Bluetooth device and Bluetooth gateway, protecting subsequent data transfer against Man in the Middle (MITM) attacks. The Bluetooth pairing mechanism may therefore be a mechanism that does not provide such security, such as the Just Works mechanism. The method may thus be particularly advantageous for use with mobile devices that may need to connect to multiple gateways, as it results in a pairing that is protected against MITM attacks without requiring use of a Bluetooth pairing mechanism that involves user interaction at the time of pairing (checking or entering a code, pushing a button on the Bluetooth device and/or gateway, etc.).

FIGS. 4a and 4b show a flow chart illustrating process steps in a further example of method 400 performed by a Bluetooth device. The steps of the method 400 illustrate one example way in which the steps of the method 300 may be implemented and supplemented in order to achieve the above discussed and additional functionality.

Referring initially to FIG. 4a, according to the method 400, in a first step 402, the Bluetooth device scans for available Bluetooth gateways. In step 404, the Bluetooth device selects an available Bluetooth gateway to pair with, for example on the basis of received scan responses. As illustrated at 404a, selecting an available Bluetooth gateway to pair with may comprise selecting an available Bluetooth gateway that advertises an identity that indicates that the available Bluetooth gateway may be able to act as an EAP authenticator for an EAP authentication method performed towards the authentication server. In some examples, the selected Bluetooth gateway may advertise an identity that fulfils one or more criteria for indicating that it is likely to have a trusted communication channel towards the authentication server with which the Bluetooth device has a shared credential. In some examples, the Bluetooth device may be provisioned with identities or partial identities of Bluetooth gateways having a trusted communication channel towards the authentication server with which the Bluetooth device has a shared credential. In such examples, it may be that a prefix of the Bluetooth gateway identity is sufficient, for example if the Bluetooth device and Bluetooth gateway share a common prefix (similar to an IP address prefix) then this may indicate to the Bluetooth device that the Bluetooth gateway is likely to have a trusted communication channel to an appropriate authentication server. Alternatively, the Bluetooth gateway identity may include for example an "EAP" prefix or suffix to show it is able to implement methods according to the present disclosure.

In step 410, the Bluetooth device uses a Bluetooth pairing mechanism to establish a pairing with the selected Bluetooth gateway by establishing a shared secret key with the Bluetooth gateway. The Bluetooth pairing mechanism may be the Just Works pairing mechanism, as illustrated at 410a. As discussed above, the Just Works pairing mechanism does not require any direct user interaction with either the Bluetooth device or the Bluetooth gateway (such as checking or entering a code, pressing a button etc.) in order to complete the pairing.

In step 422, the Bluetooth device sends a message initiating an EAP authentication method towards the authentication server based on the security credential. The EAP authentication method may comprise any current or future method supported by the EAP authentication framework. For example, the EAP authentication method may comprise EAP-TLS, EAP-PSK, EAP-pwd, EAP-AKA, EAP-AKA' etc. The message initiating the EAP authentication method is sent via the paired Bluetooth gateway and may for example include an identifier, such as the Network Access Identifier, of the Bluetooth device. Referring now to FIG. 4b, the Bluetooth device then uses the paired Bluetooth gateway to forward messages to and from the authentication server by receiving an EAP authentication request message generated by the authentication server through the paired Bluetooth gateway in step 424, and sending an EAP authentication response message for the authentication server to the paired Bluetooth gateway in step 426. The paired Bluetooth gateway may thus act as a "pass through authenticator" (as set out in RFC 3748) for the EAP method performed between the Bluetooth device and the authentication server.

As illustrated in 424a, the EAP authentication request and response messages may be received from and sent to the Bluetooth gateway respectively over at least one of a control channel or a data channel between the Bluetooth device and the paired Bluetooth gateway.

On completion of the EAP authentication method, the Bluetooth device then binds the pairing established with the paired Bluetooth gateway to the performed EAP authentication method. This is achieved by deriving, in step 432, an updated shared secret key from keying material exported by the performed EAP authentication method. The updated shared secret key may additionally be derived from the shared secret key established during pairing with the paired Bluetooth gateway. The Bluetooth device then uses the updated shared secret key to secure transfer of data to and from the paired Bluetooth gateway in step 434. Using the updated shared secret key to secure transfer of data to and from the paired Bluetooth gateway may comprise using the updated shared secret key to update the secure channel established during pairing at step 410 for secure transfer of data. Using the updated shared secret key to secure transfer of data to and from the paired Bluetooth gateway may comprise for example using the shared secret key, or a derivative of the shared secret key, for at least one of integrity protection and/or encryption of data exchanged with the Bluetooth gateway.

Steps 432a and 432b illustrate one way in which the process in step 432 of deriving an updated shared secret key from the shared secret key established during pairing with the paired Bluetooth gateway and keying material exported by the performed EAP authentication method may be achieved. In step 432a, the Bluetooth device may derive first keying material from keying material exported by the performed EAP authentication method. This may for example comprise trimming the keying material exported by the performed EAP authentication method. In step 432b, the Bluetooth device may then derive the updated shared secret key from the first keying material and the shared secret key established during pairing with the Bluetooth gateway. This may for example comprise performing a cryptographic calculation on a combination of the first keying material and the shared secret key established during pairing with the Bluetooth gateway. In other examples, the first keying material derived in step 432a may be set as the updated shared secret key.

According to examples of the present disclosure, the shared secret key established during pairing with the Bluetooth gateway may comprise a Short Term Key (STK), and the keying material exported by the EAP authentication method may comprise a Master Session Key (MSK). The first keying material (derived from the keying material exported by the performed EAP authentication method) may comprise a Pre Master Key (PMK), and the updated shared secret key may comprise a session key. Using the updated shared secret key to secure transfer of data to and from the paired Bluetooth gateway may comprise updating the Link Management Protocol (LMP) key established during pairing to be the session key.

The method 300 or 400 described above may be complimented by methods performed by a Bluetooth gateway, as described below.

Figure 5:
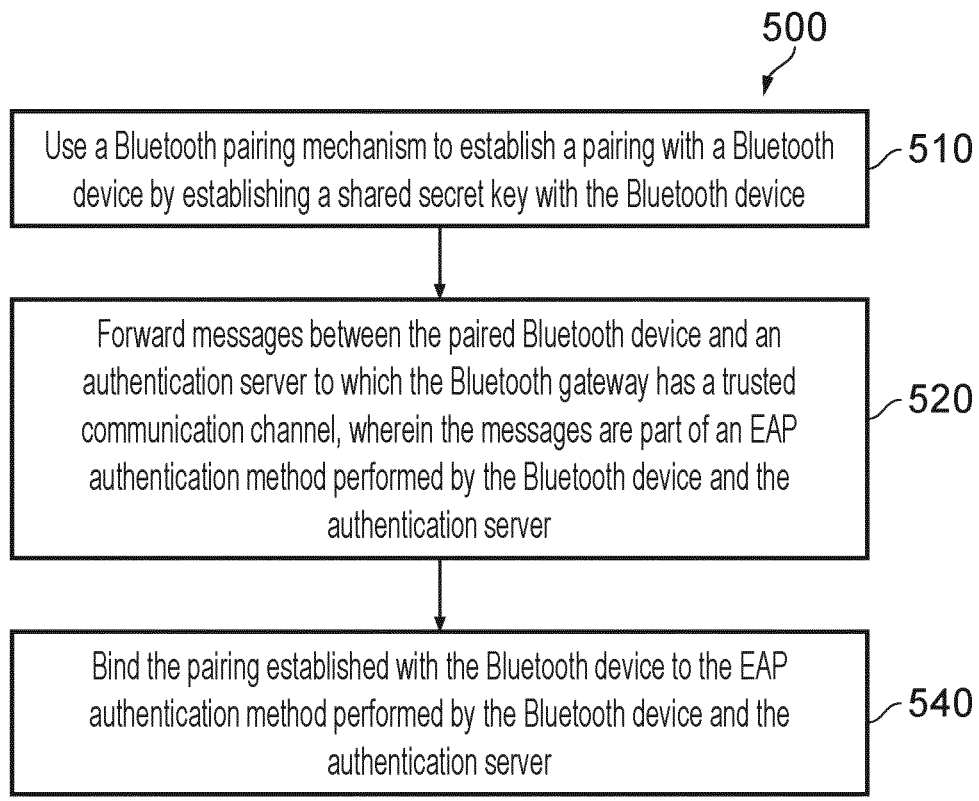
FIG. 5 is a flow chart illustrating process steps in a method performed by a Bluetooth gateway.

FIG. 5 is a flow chart illustrating process steps in a method 500 performed by a Bluetooth gateway according to examples of the present disclosure. The Bluetooth gateway may comprise any computing device that is operable to communicate using Bluetooth technology according to at least one of the Bluetooth standards maintained by the Bluetooth Special Interest Group, and is operable to provide gateway functionality towards a data network such as the Internet. Referring to FIG. 5, in a first step 510, the method 500 comprises using a Bluetooth pairing mechanism to establish a pairing with a Bluetooth device by establishing a shared secret key with the Bluetooth device. The method 500 further comprises, in step 520, forwarding messages between the paired Bluetooth device and an authentication server to which the Bluetooth gateway has a trusted communication channel. The authentication server may comprise a physical node or may comprise a virtual node offering authentication server functionality and running in a cloud, edge cloud or fog deployment. The authentication server may comprise authentication server functionality which is co-located with the Bluetooth gateway or another node. The trusted communication channel may comprise a direct secured communication channel to the authentication server, or may comprise a plurality of secured communication channels that form a hop by hop communication path to the authentication server. The messages forwarded between the paired Bluetooth device and the authentication server are part of an EAP authentication method performed by the Bluetooth device and the authentication server. Referring still to FIG. 5, in step 540, the Bluetooth gateway binds the pairing established with the Bluetooth device to the EAP authentication method performed by the Bluetooth device and the authentication server.

Figure 6A:
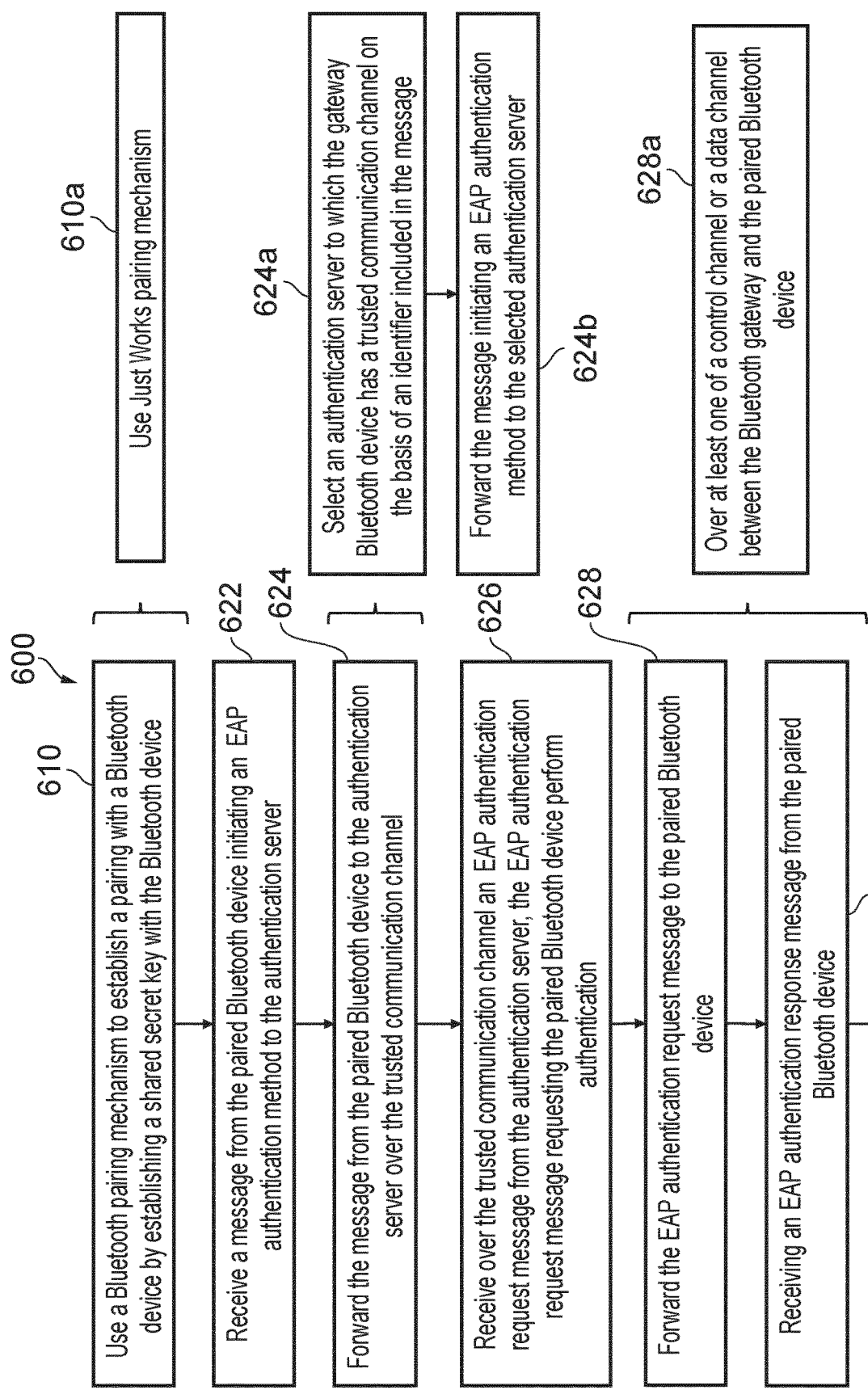
FIGS. 6a and 6b show a flow chart illustrating process steps in another example of method performed by a Bluetooth gateway.
Figure 6B:
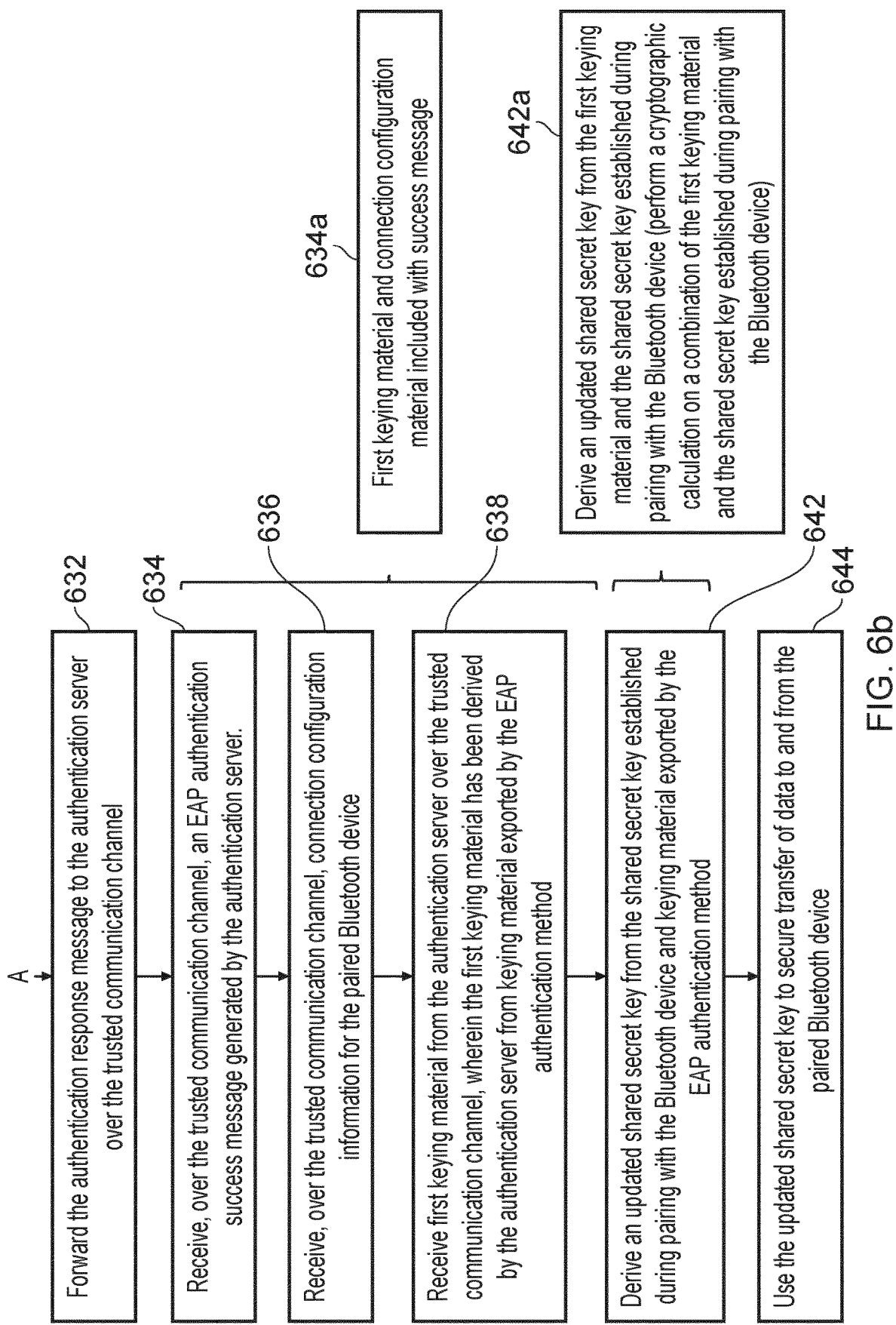

FIGS. 6a and 6b show a flow chart illustrating process steps in a further example of method 600 performed by a Bluetooth gateway. The steps of the method 600 illustrate one example way in which the steps of the method 500 may be implemented and supplemented in order to achieve the above discussed and additional functionality.

Referring initially to FIG. 6a, the Bluetooth gateway first, in step 610, uses a Bluetooth pairing mechanism to establish a pairing with a Bluetooth device by establishing a shared secret key with the Bluetooth device. The Bluetooth gateway may have previously responded to a scan request from the Bluetooth device. As illustrated in 610a, the Bluetooth pairing mechanism may comprise the Just Works pairing mechanism.

In step 622, the Bluetooth gateway receives a message from the paired Bluetooth device initiating an EAP authentication method towards an authentication server to which the Bluetooth gateway has a trusted communication channel. As discussed above with reference to FIG. 5, the authentication server may comprise a physical node or may comprise a virtual node offering authentication server functionality and running in a cloud, edge cloud or fog deployment. The authentication server may comprise authentication server functionality which is co-located with the Bluetooth gateway or another node. The trusted communication channel may comprise a direct secured communication channel to the authentication server, or may comprise a plurality of secured communication channels that form a hop by hop communication path to the authentication server.

The Bluetooth gateway then forwards the message initiating the EAP authentication method to the authentication server over the trusted communication channel in step 624. As illustrated at 624a and 624b, if the Bluetooth gateway has a trusted communication channel to more than one authentication server, this may comprise selecting an authentication server from among the authentication servers to which the Bluetooth gateway has a trusted communication channel on the basis of an identifier included in the message received at step 622, and forwarding the message initiating the EAP authentication method to the selected authentication server. The identifier included in the message initiating the EAP authentication method may for example be a Network Access Identifier. The EAP authentication method initiated by the Bluetooth device may comprise any current or future method supported by the EAP authentication framework. For example, the EAP authentication method may comprise EAP-TLS, EAP-PSK, EAP-pwd, EAP-AKA, EAP-AKA' etc.

The Bluetooth gateway may then proceed to operate as a pass through authenticator for the EAP authentication method performed by the Bluetooth device and the authentication server to which the Bluetooth gateway has a trusted communication channel, as set out in the following method steps 626 to 634.

In step 626, the Bluetooth gateway receives over the trusted communication channel an EAP authentication request message from the authentication server, the EAP authentication request message requesting the paired Bluetooth device perform authentication. In step 628, the Bluetooth gateway forwards the EAP authentication request message to the paired Bluetooth device and in step 630, the Bluetooth gateway receives an EAP authentication response message from the paired Bluetooth device. As indicated at 628a, the Bluetooth gateway may forward the EAP authentication request message and receive the EAP authentication response message over at least one of a control channel or a data channel between the Bluetooth gateway and the paired Bluetooth device.

Referring now to FIG. 6b, in step 632, the Bluetooth gateway forwards the authentication response message to the authentication server over the trusted communication channel. In some examples, the messages exchanged with the authentication server over the trusted communication channel (for example in steps 624, 626 and 632) may be encapsulated in RADIUS or Diameter protocol messages.

In some examples of the method 600, multiple EAP authentication request and response messages may be exchanged between the Bluetooth device and the authentication server before authentication success. These messages are received and forwarded by the Bluetooth gateway as discussed above with reference to steps 626, 628, 630 and 632.

In step 634, the Bluetooth gateway receives, over the trusted communication channel, an EAP authentication success message generated by the authentication server. The Bluetooth gateway further receives, over the trusted communication channel, connection configuration information for the paired Bluetooth device in step 636 and first keying material in step 638, wherein the first keying material has been derived by the authentication server from keying material exported by the EAP authentication method. As illustrated at 634a, the connection configuration information of step 636 and the first keying material of step 638 may be received with the authentication success message in step 634.

The connection configuration information received in step 636 may comprise at least one of an identification of a server to which data from the paired Bluetooth device should be forwarded and/or a limitation on connections that may be made to the paired Bluetooth device or from the paired Bluetooth device.

The Bluetooth gateway then proceeds to bind the pairing established with the Bluetooth device to the EAP authentication method performed by the Bluetooth device and the authentication server, though steps 642 and 644.

In step 642, the Bluetooth gateway derives an updated shared secret key. The updated shared secret key is derived from keying material exported by the EAP authentication method, and may additionally be derived from the shared secret key established during pairing with the Bluetooth device. As illustrated at step 642a, this may comprise deriving the updated shared secret key from the first keying material received from the authentication server in step 638 and the shared secret key established during pairing with the Bluetooth device. The updated shared secret key may be derived by performing a cryptographic calculation on a combination of the first keying material and the shared secret key established during pairing with the Bluetooth device. In other examples, the first keying material received in step 638 may be set as the updated shared secret key. In step 644, the Bluetooth gateway then uses the updated shared secret key to secure transfer of data to and from the paired Bluetooth device. Using the updated shared secret key to secure transfer of data to and from the paired Bluetooth device may comprise for example using the shared secret key, or a derivative of the shared secret key, for at least one of integrity protection and/or encryption of data exchanged with the Bluetooth device.

According to examples of the present disclosure, the shared secret key established during pairing with the Bluetooth device may comprise a Short Term Key (STK), and the first keying material received from the authentication server may comprise a Pre Master Key (PMK) that is derived by the authentication server from a Master Session Key (MSK) that is exported by the EAP authentication method. The updated shared secret key may comprise a session key. Using the updated shared secret key to secure transfer of data to and from the paired Bluetooth gateway may comprise updating the Link Management Protocol (LMP) key established during pairing to be the session key.

Figure 7:
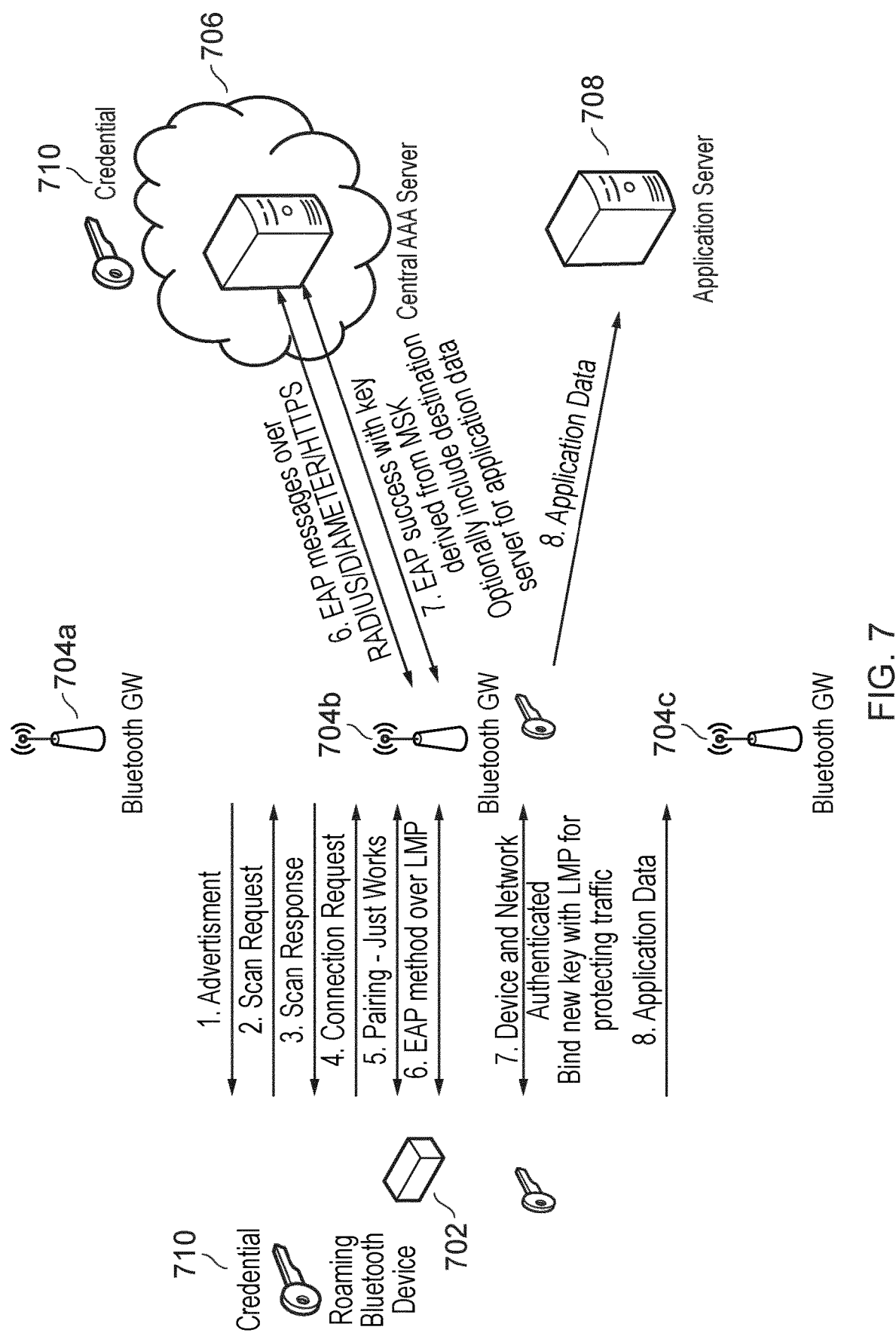
FIG. 7 illustrates a system architecture within which the methods of FIGS. 3 to 6b may be implemented.

The flow charts illustrated in FIGS. 3 to 6b thus illustrate, from the point of view of a Bluetooth device and a Bluetooth gateway, how examples of the present disclosure may be carried out. FIG. 7 illustrates a system architecture within which examples of the present disclosure may be implemented, together with an overview of method steps that may be carried out by the different entities according to an example implementation.

Referring to FIG. 7, the system architecture includes a roaming Bluetooth device 702 and multiple Bluetooth gateways 704a, 704b and 704c. The system further comprises a central authentication server, illustrated as AAA server 706, and an application server 708. The Bluetooth device 702 is provisioned with a security credential 710 that it shares with the authentication server 706. The credential may be a certificate for EAP-TLS, a PSK for EAP-PSK, or a password for EAP-pwd. Other types of credential may also be envisaged, including for example Raw Public Keys (RPKs). The device 702 seeks to obtain global connectivity through the various Bluetooth gateways 704 as it moves, changing gateway based on its mobility; when it moves out of reach of its currently used gateway it scans for new candidates and tries to connect and authenticate via a new gateway. When attaching to a new gateway 704, the device 702 runs EAP authentication towards its authentication server 706, with the gateway 704 acting as a pass through EAP authenticator. The gateway or gateways 704 and the authentication server 706 may belong to different entities, but there is trust relationship between the two so that the gateway or gateways will accept devices or clients that the authentication server authenticates, and the authentication server will accept to send keying material to the gateways. The gateways will never see the private credentials of the device 702 (for example the PSK or private key) but it will receive, from the authentication server, keying material generated from those credentials during the EAP authentication. The same private credentials are used by the device 702 towards all gateways regardless of whether they belong to the same entity or not, as the credentials are destined for the EAP authentication with the authentication server, and not for gateway itself. The device 702 does not therefore have to keep track of multiple credentials and where they can be used.

Referring to the method steps outlined in FIG. 7, the Bluetooth device 702 first scans for advertisements from Bluetooth gateways (i.e. Bluetooth devices that offer gateway functionality) in steps 1 to 3. The device 702 then connects to at least one gateway 704 using the Just Works mode of Bluetooth pairing in steps 4 and 5. As noted above, Just Works mode only provides protection against passive attackers, and it will be appreciated that a Bluetooth device may unknowingly connect to a malicious gateway using Just Works.

The Bluetooth device 702 may connect to gateways opportunistically until it succeeds in connecting to a Bluetooth gateway that has a trusted communication channel to the authentication server 706, and is thus able to act as an EAP pass through authenticator for an EAP method carried out by the Bluetooth device 702 and the authentication server 706. Alternatively, the Bluetooth device may be provisioned with identity hints that it can use to perform an educated guess as to which gateways might be able to act as pass through authenticator, based on the identities advertised by the beacons of the gateways. This may achieve better accuracy or hit rate than opportunistically connecting to gateways until a suitable gateway is found.

After pairing with the gateway 704b, the Bluetooth device starts an EAP method using its available credential 710 in step 6. The EAP method is run either over the data channel established by the Link Management Protocol (LMP) between the Bluetooth device 702 and gateway 704b, or directly inside the LMP PDUs. EAP methods do not assume that the underlying layer provides security. Most common EAP methods provide mutual authentication, so a suitable method can be selected to cater for the security requirements of a given deployment situation. The EAP messages may be sent over RADIUS, Diameter, HTTPS etc. The EAP packets are routed by the Bluetooth gateway 704b to the authentication server 706. The Bluetooth gateway may have a security agreement directly with the authentication server 706. In other examples, the Bluetooth gateway may have a security agreement with an intermediate authentication server, which in turn has (possibly via multiple intermediary servers) a security agreement with the authentication server 706.

If the Bluetooth gateway has security agreements with several authentication servers, then it can route the EAP packets based on the Network Access Identifier (NAI) provided by the client in the initial EAP message. The NAI or other identity provided by the Bluetooth device 702 thus points to the authentication server 706.

After execution of the EAP method, the Bluetooth device 702 and the authentication server 706 have authenticated each other and they both have a Master Session Key (MSK) and an Extended Master Session Key (EMSK). The authentication server 706 and Bluetooth device may then each derive first keying material (typically from the MSK). In some examples, the first keying material may in fact comprise the MSK or EMSK. In other examples, the first keying material may comprise a trimmed version of the MSK, such as a Pre Master Key (PMK). The authentication server 706 sends the first keying material to the gateway 704b along with the authentication success message in step 7. The Bluetooth device 702 and Bluetooth gateway 704 then both generate a new session key using a Key Derivation Function (KDF), the new session key for use in securing transfer of data between the Bluetooth device 702 and the Bluetooth gateway 704. In some examples, the new session key may comprise the first keying material (which as set out above may comprise a MSK, EMSK, PSK or other keying material based on the MSK or EMSK). This is expressed in the following example definitions:

First keying material=KDF(MSK)

New session key=KDF(first keying material)

The Key Derivation Functions for the above definitions may be different, and in some examples the KDFs may comprise simple substitution, such that the first keying material is set to be the MSK and the new session key is set to be the first keying material.

In other examples, the Bluetooth device 702 and Bluetooth gateway 704 may combine the first keying material with the Short Term Key (STK) established during the Just Works Bluetooth pairing using a key derivation function, to generate a new key. The key derivation function in such examples may be a concatenation and/or hash function.

Following derivation of the new session key, the Bluetooth device 702 and the gateway 704b resume the LMP (Link Management Protocol) using the new key. LMP PDUs can be used for updating the STK to be the new key.

As discussed above, one example way to derive the new STK could be:

New STK for LMP=$H$(STK-Justworks|PMK)

In the above example, the new STK is derived as a hash of the old STK from the Just Works pairing, and first keying material in the form of a Pre Master Key (PMK). The PMK is derived from the Master Session Key (MSK) that resulted from successful EAP authentication. The PMK may be a trimmed version of the MSK, and may for example be the leftmost 20-octets/bytes of the MSK.

The updating of the STK for LMP using the successful EAP authentication binds the previously opportunistic channel established during Bluetooth pairing to the EAP authentication. Now the channel is mutually authenticated and is protected even against active adversaries (step 7 between the Bluetooth device and the gateway). When the Bluetooth device or gateway is mobile and the link is lost, the Bluetooth device can attach to a new gateway using the procedures presented above, and again get authenticated network access without requiring manual intervention to support a pairing mechanism that is dependent on such interaction.

As discussed above, the authentication server can send connection configuration information to the gateway together with the authentication success message in step 7 of FIG. 7. This connection configuration information may include the address of the application server 708 where further non-IP application data received from the Bluetooth device 702 over Bluetooth should be sent. The connection configuration information may also include a limitation on connections that may be made to the paired Bluetooth device or from the paired Bluetooth device. In this manner, the gateway may learn where to forward data received from the device, and from where to accept incoming connections to the device, if that is appropriate for a particular deployment. The gateway may thus act as a smart proxy and firewall serving the Bluetooth device, ensuring that after the initial authentication, application data can be transferred from the Bluetooth device to a different server, configurable by the Bluetooth device owner, instead of leaving it at the gateway. The communication configuration policies for the device may be sent together with the success message from the authentication server using for example RADIUS or Diameter, the protocol(s) used between the gateway and authentication server when using EAP. As the gateway will typically be the IP terminating endpoint for the communication of the device, the device may use application layer security to achieve end-to-end security to the application server. However, in some examples it may be possible to perform IP over Bluetooth.

The methods 300 to 600, as discussed above, may be performed by a Bluetooth device and a Bluetooth gateway.

Figure 8:
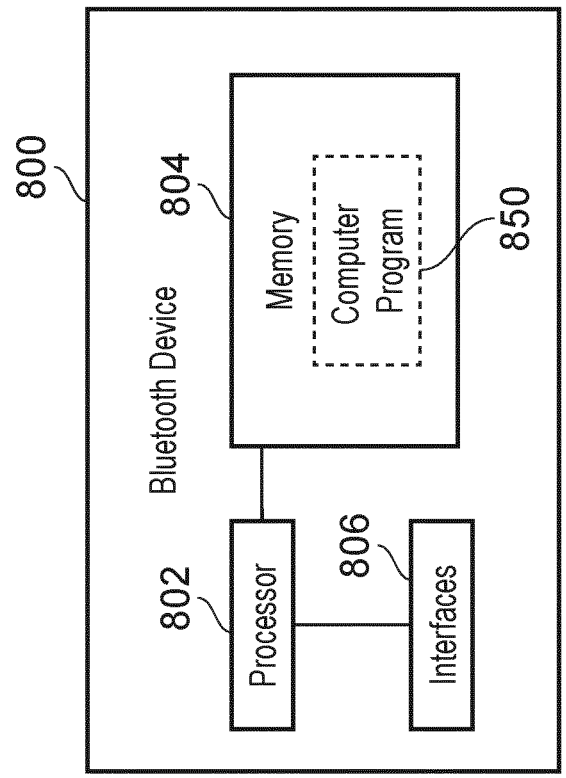
FIG. 8 is a block diagram illustrating functional modules in a Bluetooth device.

FIG. 8 is a block diagram illustrating an example Bluetooth device 800 which may implement the method 300 and/or 400 according to examples of the present disclosure, for example on receipt of suitable instructions from a computer program 850. Referring to FIG. 8, the Bluetooth device 800 comprises a processor or processing circuitry 802, and may comprise a memory 804 and interfaces 806. The processing circuitry 802 is operable to perform some or all of the steps of the method 300 and/or 400 as discussed above with reference to FIGS. 3, 4*a* and 4*b*. The memory 804 may contain instructions executable by the processing circuitry 802 such that the Bluetooth device 800 is operable to perform some or all of the steps of the method 300 and/or 400. The instructions may also include instructions for executing one or more telecommunications and/or data communications protocols. The instructions may be stored in the form of the computer program 850. In some examples, the processor or processing circuitry 802 may include one or more microprocessors or microcontrollers, as well as other digital hardware, which may include digital signal processors (DSPs), special-purpose digital logic, etc. The processor or processing circuitry 802 may be implemented by any type of integrated circuit, such as an Application Specific Integrated Circuit (ASIC), Field Programmable Gate Array (FPGA) etc. The memory 804 may include one or several types of memory suitable for the processor, such as read-only memory (ROM), random-access memory, cache memory, flash memory devices, optical storage devices, solid state disk, hard disk drive etc.

Figure 9:
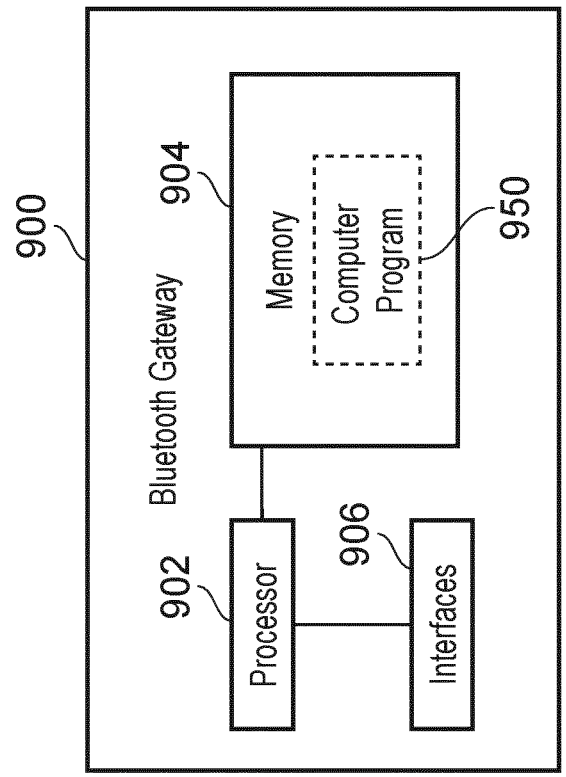
FIG. 9 is a block diagram illustrating functional modules in a Bluetooth gateway.

FIG. 9 is a block diagram illustrating an example Bluetooth gateway 900 which may implement the method 500 and/or 600 according to examples of the present disclosure, for example on receipt of suitable instructions from a computer program 950. Referring to FIG. 9, the Bluetooth gateway 900 comprises a processor or processing circuitry 902, and may comprise a memory 904 and interfaces 906. The processing circuitry 902 is operable to perform some or all of the steps of the method 500 and/or 600 as discussed above with reference to FIGS. 5, 6*a* and 6*b*. The memory 904 may contain instructions executable by the processing circuitry 902 such that the Bluetooth gateway 900 is operable to perform some or all of the steps of the method 500 and/or 600. The instructions may also include instructions for executing one or more telecommunications and/or data communications protocols. The instructions may be stored in the form of the computer program 950. In some examples, the processor or processing circuitry 902 may include one or more microprocessors or microcontrollers, as well as other digital hardware, which may include digital signal processors (DSPs), special-purpose digital logic, etc. The processor or processing circuitry 902 may be implemented by any type of integrated circuit, such as an Application Specific Integrated Circuit (ASIC), Field Programmable Gate Array (FPGA) etc. The memory 904 may include one or several types of memory suitable for the processor, such as read-only memory (ROM), random-access memory, cache memory, flash memory devices, optical storage devices, solid state disk, hard disk drive etc.

It will be appreciated from the above discussion that examples of the present disclosure provide a Bluetooth device, Bluetooth gateway and associated methods that add support for additional authentication methods for Bluetooth through the use of EAP. Examples of the present disclosure thus offer a solution to the challenge of securing data transfer over a Bluetooth connection without requiring user interaction during pairing or authentication. In performing an EAP authentication method between a Bluetooth device and authentication server, and binding the result of that authentication to an existing Bluetooth pairing, example methods disclosed herein ensure that a Bluetooth device can pair with a Bluetooth peer in a secure manner without needing manual intervention, so offering autonomous operation and connectivity establishment that may be particularly useful for mobile Bluetooth devices.

When examples of the present disclosure are used with the Just Works pairing mechanism, they provide additional security to Just Works, protecting against active MITM attacks without requiring the user interaction that is a feature of the other Bluetooth pairing mechanisms.

Examples of the present disclosure also offer the possibility to provide connection configuration information for the Bluetooth device to the paired gateway, so that the data generated by the Bluetooth device can automatically be routed to the right destination. If desired, access for Bluetooth devices can be revoked from a central server. Bluetooth devices can roam to different networks (potentially run by different operators) and benefit from connectivity as long as there is a trust relationship between the foreign and home network.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A Bluetooth device, wherein the Bluetooth device is provisioned with a security credential that is shared with an authentication server, the Bluetooth device comprising processing circuitry configured to cause the Bluetooth device to perform a method comprising:
    the Bluetooth device using a Bluetooth pairing mechanism, which comprises a Just Works pairing mechanism, to establish a pairing with a Bluetooth gateway by establishing a shared secret key with the Bluetooth gateway;
    the Bluetooth device performing an Extensible Authentication Protocol (EAP) authentication method towards the authentication server using the security credential, wherein performing the EAP authentication method comprises:
        the Bluetooth device transmitting an Extensible Authentication Protocol (EAP) initiation message to the authentication server via the Bluetooth gateway;
        the Bluetooth device, after transmitting the EAP initiation message to the authentication sever, receiving from the Bluetooth gateway an EAP request message generated by the authentication sever;
        the Bluetooth device, after receiving from the Bluetooth gateway the EAP request message generated by the authentication server, transmitting to the authentication server via the Bluetooth gateway an EAP response message responsive to the EAP request message;
        the Bluetooth device, after transmitting the EAP response message to the authentication sever, receiving from the Bluetooth gateway an EAP success message generated by the authentication sever; and
    binding the pairing established with the paired Bluetooth gateway to the performed EAP authentication method, wherein
    binding the pairing established with the paired Bluetooth gateway to the performed EAP authentication method comprises deriving an updated shared secret key from keying material exported by the performed EAP authentication method, and
    the method further comprises using the updated shared secret key to secure transfer of data to and from the paired Bluetooth gateway.

2. The Bluetooth device of claim 1, wherein the method further comprises:
    prior to pairing with the Bluetooth gateway, performing a pairing process comprising:
        detecting that the Bluetooth gateway is available;
        determining that the Bluetooth gateway is operable to function as an EAP authenticator for an EAP authentication method performed towards the authentication server; and
        using the Just Works pairing mechanism to establish a pairing with the Bluetooth gateway in response to determining that the Bluetooth gateway is available and operable to function as an EAP authenticator for an EAP authentication method performed towards the authentication server.

3. The Bluetooth device of claim 2, wherein the processing circuitry is configured to derive the updated shared secret key from the first keying material and the shared secret key established during pairing with the Bluetooth gateway by performing a cryptographic calculation on a combination of the first keying material and the shared secret key established during pairing with the Bluetooth gateway.

4. The Bluetooth device of claim 1, wherein deriving an updated shared secret key from keying material exported by the performed EAP authentication method comprises:
    deriving first keying material from the keying material exported by the performed EAP authentication method; and
    deriving the updated shared secret key from the first keying material and the shared secret key established during pairing with the Bluetooth gateway.

5. The Bluetooth device of claim 1, wherein the processing circuitry is further configured to:
    scan for available Bluetooth gateways; and
    select an available Bluetooth gateway to pair with.

6. The Bluetooth device of claim 5, wherein the processing circuitry is configured to select an available Bluetooth gateway to pair with by:
    selecting an available Bluetooth gateway that advertises an identity that indicates that the available Bluetooth gateway may be able to act as an EAP authenticator for an EAP authentication method performed towards the authentication server.

7. A Bluetooth gateway comprising processing circuitry configured to cause the Bluetooth gateway to perform a method comprising:
    using a Bluetooth pairing mechanism, which comprises a Just Works pairing mechanism, to establish a pairing with a Bluetooth device by establishing a shared secret key with the Bluetooth device;
    after the pairing is established with the Bluetooth device, receiving an Extensible Authentication Protocol (EAP) initiation message transmitted by the Bluetooth device;
    forwarding to an authentication server the EAP initiation message received from the Bluetooth device;
    after forwarding to the authentication server the EAP initiation message received from the Bluetooth device, receiving from the authentication server an EAP request message;
    forwarding to the Bluetooth device the EAP request message received from the authentication server;
    after forwarding to the Bluetooth device the EAP request message received from the authentication server, receiving from the Bluetooth device an EAP response message;
    forwarding to the authentication server the EAP response message received from the Bluetooth device;
    after forwarding to the authentication sever the EAP response message received from the Bluetooth device, receiving from the authentication server an EAP success message;
    forwarding to the Bluetooth device the EAP success message received from the authentication server;
    deriving an updated shared secret key using information from the EAP success message; and
    using the updated shared secret key to secure transfer of data to and from the paired Bluetooth device.

8. The Bluetooth gateway of claim 7, wherein deriving the updated shared secret key using information from the EAP success message comprises:
    deriving first keying material from the keying material from the EAP success message; and deriving the updated shared secret key from the first keying material and the shared secret key established during pairing with the Bluetooth gateway.

9. The Bluetooth gateway of claim 7, wherein
the Bluetooth gateway has a trusted communication channel to a plurality of authentication servers,
after receiving the EAP initiation message transmitted by the Bluetooth device, selecting one of the plurality of authentication severs, and
the EAP initiation message is transmitted to the selected authentication sever.

10. The Bluetooth gateway of claim 7, wherein
the method further comprises receiving connection configuration information for the paired Bluetooth device.

11. The Bluetooth gateway of claim 7, wherein the processing circuitry is configured to derive the updated shared secret key from the first keying material and the shared secret key established during pairing with the Bluetooth device by performing a cryptographic calculation on a combination of the first keying material and the shared secret key established during pairing with the Bluetooth device.

12. A method performed by a Bluetooth device, wherein the Bluetooth device is provisioned with a security credential that is shared with an authentication server, the method comprising:
using a Bluetooth pairing mechanism, which comprises a Just Works pairing mechanism, to establish a pairing with a Bluetooth gateway by establishing a shared secret key with the Bluetooth gateway;
performing an Extensible Authentication Protocol (EAP) authentication method towards the authentication server using the security credential, wherein performing the EAP authentication method comprises:
transmitting an Extensible Authentication Protocol (EAP) initiation message to the authentication server via the Bluetooth gateway;
after transmitting the EAP initiation message to the authentication sever, receiving from the Bluetooth gateway an EAP request message generated by the authentication sever;
after receiving from the Bluetooth gateway the EAP request message generated by the authentication server, transmitting to the authentication server via the Bluetooth gateway an EAP response message responsive to the EAP request message;
after transmitting the EAP response message to the authentication sever, receiving from the Bluetooth gateway an EAP success message generated by the authentication sever; and
binding the pairing established with the paired Bluetooth gateway to the performed EAP authentication method, wherein
binding the pairing established with the paired Bluetooth gateway to the performed EAP authentication method comprises deriving an updated shared secret key from keying material exported by the performed EAP authentication method, and
the method further comprises using the updated shared secret key to secure transfer of data to and from the paired Bluetooth gateway.

13. A method performed by a Bluetooth gateway, the method comprising:
using a Bluetooth pairing mechanism, which comprises a Just Works pairing mechanism, to establish a pairing with a Bluetooth device by establishing a shared secret key with the Bluetooth device;
after the pairing is established with the Bluetooth device, receiving an Extensible Authentication Protocol (EAP) initiation message transmitted by the Bluetooth device;
forwarding to an authentication server the EAP initiation message received from the Bluetooth device;
after forwarding to the authentication server the EAP initiation message received from the Bluetooth device, receiving from the authentication an EAP request message;
forwarding to the Bluetooth device the EAP request message received from the authentication server;
after forwarding to the Bluetooth device the EAP request message received from the authentication server, receiving from the Bluetooth device an EAP response message;
forwarding to the authentication server the EAP response message received from the Bluetooth device;
after forwarding to the authentication sever the EAP response message received from the Bluetooth device, receiving from the authentication server an EAP success message;
forwarding to the Bluetooth device the EAP success message received from the authentication server;
deriving an updated shared secret key using information from the EAP success message; and
using the updated shared secret key to secure transfer of data to and from the paired Bluetooth device.

* * * * *